United States Patent
Takizawa

(10) Patent No.: US 7,630,034 B2
(45) Date of Patent: Dec. 8, 2009

(54) ELECTRO-OPTICAL DEVICE HAVING THREE SUB-PIXELS WITH THREE COLORS IN EACH OF TRANSMITTING AND REFLECTING DISPLAY REGIONS WITH ONE FURTHER SUB-PIXEL IN TRANSMITTING DISPLAY REGION HAVING DIFFERENT COLOR BUT SAME AREA AS THE THREE COLOR SUB-PIXELS

(75) Inventor: Keiji Takizawa, Azumino (JP)

(73) Assignee: Epson Imaging Devices Corporation, Azumino-shi (JP)

( * ) Notice: Subject to any disclaimer, the term of this patent is extended or adjusted under 35 U.S.C. 154(b) by 618 days.

(21) Appl. No.: 11/436,625

(22) Filed: May 19, 2006

(65) Prior Publication Data

US 2006/0274234 A1    Dec. 7, 2006

(30) Foreign Application Priority Data

May 19, 2005  (JP)  ............................. 2005-146427
Oct. 18, 2005  (JP)  ............................. 2005-303256

(51) Int. Cl.
    *G02F 1/1335*  (2006.01)
(52) U.S. Cl. .................. 349/106; 349/108; 349/109; 349/114
(58) Field of Classification Search ......... 349/106–109, 349/114
See application file for complete search history.

(56) References Cited

U.S. PATENT DOCUMENTS

| 6,950,156 | B1 | 9/2005 | Yoshida | |
|---|---|---|---|---|
| 2003/0053012 | A1* | 3/2003 | Ikeno et al. | 349/106 |
| 2003/0081156 | A1* | 5/2003 | Creemers et al. | 349/106 |
| 2005/0270444 | A1* | 12/2005 | Miller et al. | 349/108 |

FOREIGN PATENT DOCUMENTS

| EP | 1 251 389 A2 | 10/2002 |
|---|---|---|
| JP | A-2000-330102 | 11/2000 |
| JP | A-2001-306023 | 11/2001 |
| JP | A 2002-258019 | 9/2002 |
| JP | A-2003-149631 | 5/2003 |

* cited by examiner

*Primary Examiner*—John Heyman
(74) *Attorney, Agent, or Firm*—Oliff & Berridge, PLC

(57) ABSTRACT

An electro-optical device includes three sub-pixels each having a transmitting region and a reflecting region in which a coloring layer having one color among three colors is respectively included and corresponding to the three respective colors and at least one sub-pixel in which a coloring layer having one color other than the three colors is disposed in the transmitting region. In the transmitting region, transmission display is performed and in the reflection region, reflection display is performed. A color display is performed by the reflection display or the transmission display, and one pixel is formed as a display unit by using the transmitting regions of the three sub-pixels corresponding to the three colors and at least one sub-pixel and the reflecting regions of the three sub-pixels corresponding to the three colors.

15 Claims, 7 Drawing Sheets

ELECTRO-OPTICAL DEVICE HAVING THREE SUB-PIXELS WITH THREE COLORS IN EACH OF TRANSMITTING AND REFLECTING DISPLAY REGIONS WITH ONE FURTHER SUB-PIXEL IN TRANSMITTING DISPLAY REGION HAVING DIFFERENT COLOR BUT SAME AREA AS THE THREE COLOR SUB-PIXELS

This application claims the benefit of Japanese Patent Application No. 2005-146427, filed May 19, 2005, and Japanese Patent Application No. 2005-303256, filed Oct. 18, 2005. The entire disclosures of the prior applications are hereby incorporated by reference herein in their entirety.

BACKGROUND

1. Technical Field

The invention relates to an electro-optical device and an electronic apparatus, and in particular, to a structure of an electro-optical device including a color filter having a plurality of coloring layers and allowing both the reflection display and transmittance display of colors to be utilized by the color filter.

2. Related Art

In general, a color filter is employed for allowing color display to be performed in a liquid crystal display (LCD) or other various electro-optical devices. This color filter is, for example, formed such that a plurality of coloring layers, such as, red, green, and blue coloring layers, are respectively disposed in every pixel and the plurality of coloring layers are arranged in a predetermined pattern. Such coloring layers are formed, for example, by a photolithography method using a photosensitive resin containing colorant (e.g., pigment, dye, or the like).

Meanwhile, there is a known display device, which has a backlight disposed at the rear side of the electro-optical device to display the visible transmission by using lights of the backlight in a relatively dark environment such as indoors or in the car, and turns off the backlight to display visible reflection by using external lights in a bright location such as outdoors. In this type of device, a transmitting region allowing lights to be transmitted and a reflecting region allowing lights to be reflected are formed within each pixel, and the transmission display is utilized by using the transmitting region and the reflection display is utilized by using the reflecting region.

In this case, the coloring layer needs to be formed at both sides of the transmitting and reflecting regions in order to utilize the color display at both sides thereof, however, lights from the backlight transmit the coloring layer in the transmitting region only once whereas external light transmit the coloring layer twice by going and returning, such that bright display is possible at the expense of color saturation in the transmission display, and it is easy to increase the color saturation at the expense of bright display in the reflection display. Accordingly, the coloring layer in the transmitting region generally needs to have higher color saturation than the coloring layer of the reflecting region.

In order to have coloring layers with different color saturations from each other in the transmitting and reflecting regions, an amount of colorants contained in the coloring layer should be changed, such that the different kinds of the coloring layers cause a manufacture process thereof to be complicated. Here, there is a well-known color filter for an LCD. The color filter has coloring layers with two colors stacked sequentially in the transmitting region among three complementary colors of cyan, magenta, and yellow while having each of the two colors disposed as a single layer in the reflecting region in order to form three primary colors of red, green, and blue colors such that a color saturation for the transmission display can be secured and a brightness of the reflection display can be obtained (e.g., refer to JP-A-2002-258029).

However, in the electro-optical device which allows both of the transmission display and the reflection display to be utilized, a substantial aperture ratio of the transmission display decreases due to the formation of the reflecting region while a substantial aperture ratio of the reflection display simultaneously decreases due to the formation of the transmitting region, such that it is difficult to secure the brightness of the display and utilize a visual balance between the two displays.

In particular, a luminance or a contrast of the reflection display is originally and significantly lower than a luminance or a contrast of the transmission display, such that the reflecting region is given priority so as to secure brightness whereas a high display quality (e.g., a contrast, color reproducibility, or the like) is required for the transmission display. Thus, it is necessary to improve the quality of the color filter in the transmitting region having a limited area in order to improve the display quality of the transmission display. However, when the coloring layers of the reflecting and transmitting regions are formed of separate materials from each other to produce high quality of the transmission display, the number of the processes of manufacturing the color filter increases, which increases the manufacture cost.

SUMMARY

An advantage of some aspects of the invention is that is provides a color filter structure capable of easily securing high quality display of transmission and reflection displays and a balance therebetween by differing a color element of the transmission display from a color element of the reflection display so as to utilize color displays of the transmission and reflection displays, and an electro-optical device having the same.

According to one aspect of the invention, an electro-optical device includes three sub-pixels each having a transmitting region and a reflecting region in which a coloring layer having one color among three colors is included and corresponding to the three respective colors and at least one sub-pixel in which a coloring layer having one color excepting the three colors is disposed in the transmitting region. In the transmitting region, transmission display is performed, and by the reflection region, reflection display is performed. A color display is performed in the reflection display or the transmission display and one pixel is formed as a display unit by using the transmitting regions of the three sub-pixels corresponding to the three colors and at least one sub-pixel and the reflecting regions of the three sub-pixels corresponding to the three colors.

According to this aspect, the coloring layer is disposed in each of the transmitting and reflecting regions in the sub-pixels having three colors to allow the reflection display to be colored by the coloring layer having three colors, and the transmitting region where at least one coloring layer other than the three colors is disposed in at least one sub-pixel to represent the transmission display with at least four colors, such that high color reproducibility can be obtained in the display quality of the transmission display and a balance between the transmission and reflection displays. In particular, the transmission display is represented with at least four colors to allow wider hues to be reproduced even when the color saturation of each color is not made to increase, such that the coloring layers having three colors constituting the reflection display can be appropriately set with color saturations for securing the brightness of the reflection display. Accordingly, even when the coloring layers having basic three colors are formed of the common coloring material in the transmitting and reflecting regions, the balance between the color reproducibility of the transmission display and the brightness of the reflection display can be secured.

It is preferable that he transmitting regions of the three sub-pixels corresponding to the three colors have the same area as at least one sub-pixel. Accordingly, the transmitting regions of at least four kinds of sub-pixels have the same area as each other so as to control the color display with the coloring layers of at least four colors in the transmission display.

It is preferable that the reflecting regions of the three sub-pixels corresponding to the three colors have the same area with each other. Accordingly, a luminance or a contrast is significantly lower in the reflection display than the transmission display, such that the color display can be controlled by the coloring layers having three colors in the reflection display when the reflecting regions of the three sub-pixels have the same area as each other.

It is preferable that a longitudinal transmitting region section in which the transmitting regions of the three sub-pixels corresponding to the three colors and at least one sub-pixel are arranged in a line is disposed in parallel with a longitudinal reflecting region section in which the reflecting regions of the three sub-pixels corresponding to the three colors are arranged in a line so as to make a directional length of the arranged regions of the longitudinal transmitting region section be equal to a directional length of the arranged regions of the longitudinal reflecting region section. Accordingly, when the transmitting regions of at least four sub-pixels constituting the transmission display are arranged in a line to constitute the longitudinal transmitting region section, the reflecting regions of three sub-pixels constituting the reflection display are arranged in a line to constitute the longitudinal reflecting region section, and the longitudinal reflecting region section and the longitudinal transmitting region section are arranged in parallel with each other while the directional length of the arranged regions of the longitudinal transmitting region section is equal to the directional length of the arranged regions of the longitudinal reflecting region section, a pixel that is to be a display unit can be formed to be compact, and a planar shape of the display unit can be simply shaped, such as a rectangle, such that the pixels to be the display units can be easily and predeterminedly arranged without gaps.

It is preferable that the transmitting region is constructed by the longitudinal transmitting region section which is equally divided in the direction of the arranged regions, and the reflecting region is constructed by the longitudinal reflecting region section which is equally divided. Accordingly, the directional widths of at least four arranged transmitting regions disposed within a display unit become equal to directional widths of the three arranged reflecting regions, such that a pixel structure can be generally utilized. Alternatively, widths of the respective colors may be changed in accordance with the color control characteristics of the transmission and reflection displays to properly adjust the area ratio of the respective colors.

It is preferable that the three colors be primary colors for a filter, and the color other than the three colors is a complementary color for the filter. By adding at least one complementary color to the primary colors for the filter color, the color reproducibility of the color display can be further improved. In this case, it is the most effective when the color other than the three colors is cyan for securing a wide color reproducibility range.

According to another aspect of the invention, electro-optical device includes three sub-pixels having a transmitting region and a reflecting region in which a coloring region having one color among three colors is respectively included and corresponding to the three respective colors and at least one sub-pixel in which a coloring region having one color other than the three colors is disposed in the transmitting region. In the transmitting region, transmission display is performed, and in the reflection region, reflection display is performed. A color display is performed in the reflection display or the transmission display, and one pixel is configured as a display unit by using the transmitting regions of the three sub-pixels corresponding to the three colors and at least one sub-pixel and the reflecting regions of the three sub-pixels corresponding to the three colors.

According to the aspect, the coloring region is disposed in each of the transmitting and reflecting regions in the sub-pixels having three colors to allow the reflection display to be colored by the coloring region having three colors, and the transmitting region, in which at least one coloring region other than the three colors is disposed in at least one sub-pixel to represent the transmission display with at least four colors, such that high color reproducibility can be obtained in the display quality of the transmission display and a balance between the transmission and reflection displays. In particular, the transmission display is represented with at least four colors to allow wider hues to be reproduced even when the color saturation of each color is not made to increase, such that the coloring regions having three colors constituting the reflection display can be appropriately set with color saturations so as to secure the brightness of the reflection display. Accordingly, even when the coloring regions having basic three colors are formed of the common coloring material in the transmitting and reflecting regions, the balance between the color reproducibility of the transmission display and the brightness of the reflection display can be secured.

It is preferable that transmitting regions of the three sub-pixels corresponding to the three colors and at least one sub-pixel have the same area with each other. Accordingly, the transmitting regions of at least four kinds of the sub-pixels have the same area as each other so as to control the color display by the coloring regions having at least four colors in the transmission display.

It is preferable that the reflecting regions of the three sub-pixels corresponding to the three colors have the same area with each other. Accordingly, a luminance or a contrast is significantly lower in the reflection display than the transmission display, such that the color display can be controlled by the coloring regions having three colors in the reflection display when the reflecting regions of the three sub-pixels have the same area as each other.

It is preferable that a longitudinal transmitting region section in which the transmitting regions of the three sub-pixels corresponding to the three colors and at least one sub-pixel are arranged in a line is disposed in parallel with a longitudinal reflecting region section in which the reflecting regions of the three sub-pixels corresponding to the three colors are arranged in a line so as to make a directional length of the arranged regions of the longitudinal transmitting region section be equal to a directional length of the arranged regions of the longitudinal reflecting region section. Accordingly, when the transmitting regions of at least four sub-pixels constituting the transmission display are arranged in a line to constitute the longitudinal transmitting region section, the reflecting regions of three sub-pixels constituting the reflection display are arranged in a line to constitute the longitudinal reflecting region section, and the longitudinal reflecting region section and the longitudinal transmitting region section are arranged in parallel with each other while the directional length of the arranged regions of the longitudinal transmitting region section is equal to the directional length of the arranged regions of the longitudinal reflecting region section, a pixel that is to be a display unit can be formed to be compact, and a planar shape of the display unit can be simply shaped, such as a rectangle, such that the pixels that are to be the display units can be easily and predeterminedly arranged without gaps.

It is preferable that the transmitting region is constructed by the longitudinal transmitting region section which is equally divided in the direction of the arranged regions, and the reflecting region is constructed by the longitudinal reflecting region section which is equally divided. Accordingly, the directional widths of at least four arranged transmitting regions disposed within a display unit become equal to the directional widths of the three arranged reflecting regions, such that a pixel structure can be generally used. Alternatively, widths of the respective colors may be changed in accordance with the color control characteristics of the transmission and reflection displays to properly adjust the area ratio of the respective colors.

It is preferable that the coloring region corresponding to the three colors be one of a coloring region based on a blue hue, a coloring region based on a red hue, and one of two coloring regions of two kinds of hues selected from hues ranging from the blue hue to a yellow hue among visible light regions in which hues change in accordance with the wavelengths, and the coloring region corresponding to the color other than the three colors be the other of the two coloring regions of two kinds of hues selected from the hues ranging from the blue hue to the yellow hue. The color number of the coloring regions in the transmitting region is made to be greater than the color number of the coloring regions in the reflecting region, such that the color reproducibility of the color display can be further improved. In this case, it is preferable that the coloring regions of the two kinds of hues selected from the hues ranging from the blue hue to the yellow hue be a coloring region of a green hue from the blue hue and a coloring region of an orange hue from the green hue.

It is preferable that the coloring regions corresponding to the three colors be one of a first coloring region having a wavelength peak of light in a range of 415 nm to 500 nm which has transmitted the corresponding coloring region, a second coloring region having the wavelength peak which is more or equal to 600 nm, a third coloring region having the wavelength peak in a range of 485 nm to 0.535 nm, and a fourth coloring region having the wavelength peak in a range of 500 nm to 590 nm, and the coloring region corresponding to the color other than the three colors is the third coloring region or the fourth coloring region. The color number of the coloring regions in the transmitting region is made to be greater than the color number of the coloring regions in the reflecting region, such that the color reproducibility of the color display can be more improved. In this case, it is preferable that the third coloring region have the wavelength peak of light in a range of 495 nm to 520 nm which has transmitted the corresponding coloring region, and the fourth coloring region have the wavelength peak of light in a range of 510 nm to 585 nm which has transmitted the corresponding coloring region.

According to another aspect of the invention, an electronic apparatus includes any one of the electro-optical devices described above and a control unit which controls the electro-optical device. The electro-optical device of the aspect can utilize both of the transmission and reflection displays which have high correspondence to changes from external environment, such that it can be effective when it is mounted on a portable electronic apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
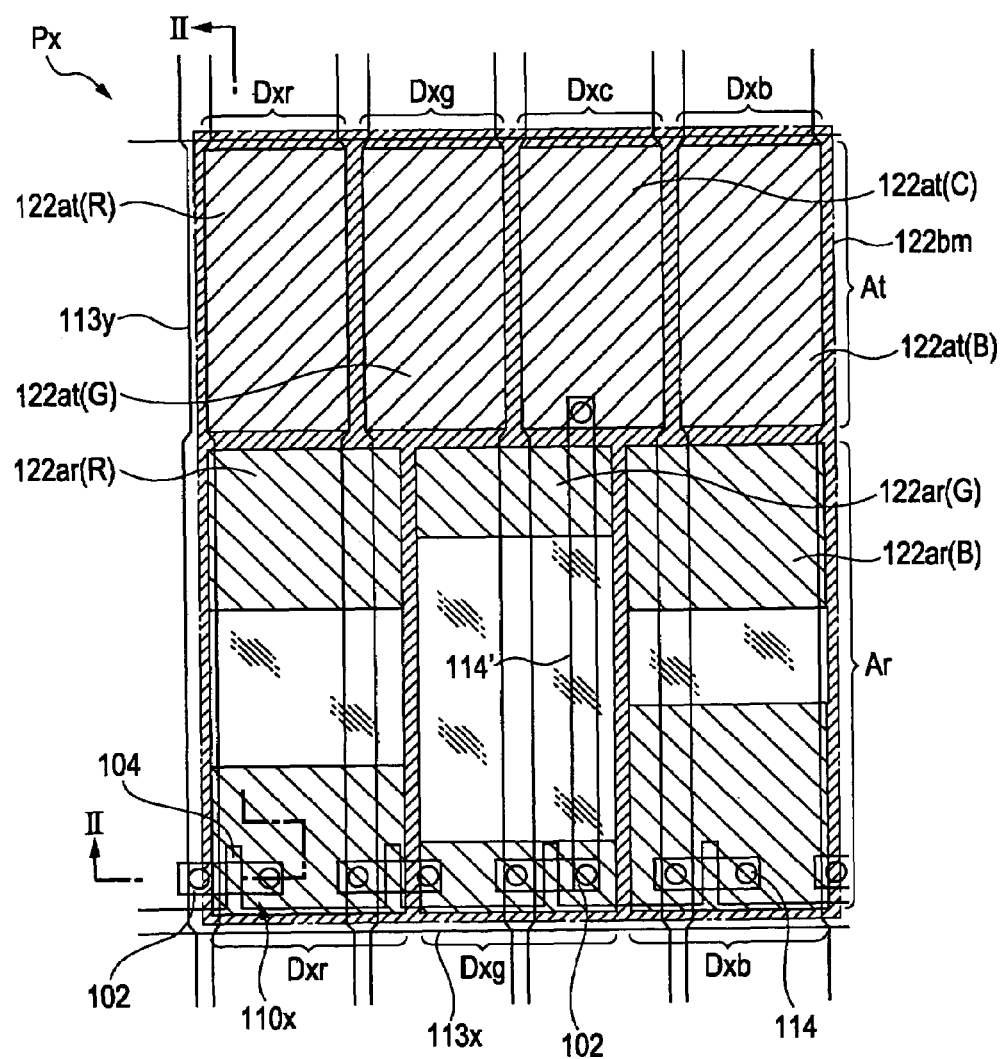
FIG. 1 is a schematic plan diagram of a structure of one pixel of an electro-optical device according to a first embodiment of the invention.
Figure 2:
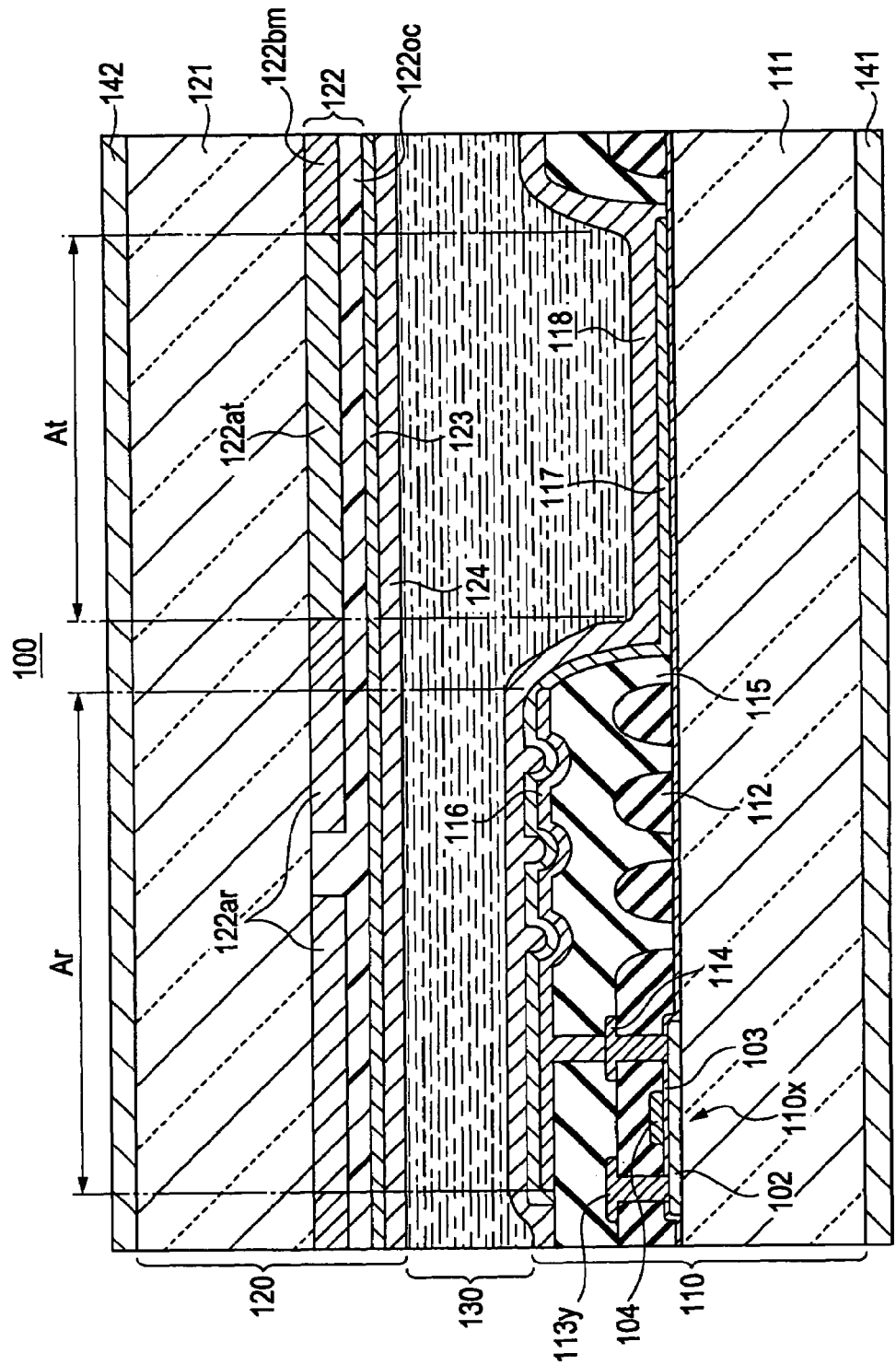
FIG. 2 is a schematic longitudinal cross-sectional diagram of one sub-pixel of the electro-optical device according to the first embodiment of the invention.

Hereinafter, embodiments of the invention will be described in detail with reference to the accompanying drawings. FIG. 1 is an enlarged perspective diagram showing an arrangement of sub-pixels constituting a display unit (pixel) and an internal structure of the pixel according to the first embodiment of the electro-optical device of the invention. FIG. 2 is an enlarged longitudinal section diagram showing a cross-sectional structure of one sub-pixel of the same electro-optical device.

The present embodiment employs an LCD as one kind of electro-optical device. A base 110 and a base 120 are separated from each other by a predetermined gap by using a sealant or the like and a liquid crystal layer 130 is disposed therebetween.

The base 110 includes a transparent substrate 111 formed of glass or plastic. A TFT (switching element) 110X having a semiconductor layer 102 formed of polysilicon layer or the like on an inner surface of the substrate 111, a gate insulating layer 103 disposed on the semiconductor layer 102, and a gate electrode 104 opposite to a channel region of the semiconductor layer 102 having the gate insulating layer 103 interposed therebetween. The gate electrode 104 is electrically connected to a scan line 113*x* shown in FIG. 1.

An interlayer insulating layer 112 formed of a silicon oxide or the like is formed thereon, and the interlayer insulating layer 112 covers the TFT 110X and has small unevenness on a surface thereof according to a photolithography method. A data line 113y electrically connected to a source region of the semiconductor layer 102, and a connection electrode 114 electrically connected to a drain region of the semiconductor layer 102 are disposed on the interlayer insulating layer 112.

An interlayer insulating layer 115 formed of a silicon oxide or the like is further disposed thereon, and a reflecting layer 116 formed of metal such as aluminum or reflective conductor is disposed on the interlayer insulating layer 115. The reflecting layer 116 is electrically connected to the connection electrode 114. The reflecting layer 116 has a scattering reflective surface having a small unevenness that reflects the shape of the surface unevenness of the interlayer insulating layer 112. The reflecting layer 116 has an island shape within a sub-pixel which corresponds to a reflecting region Ar formed within the sub-pixel. A transmitting region At is formed within the sub-pixel in addition to the reflecting region Ar, and the reflecting layer 116 is not disposed within the transmitting region At.

An electrode 117 formed of a transparent conductor such as an ITO (Indium Tin Oxide) is disposed on the reflecting layer 116, and the electrode 117 is disposed over the entire display range of the sub-pixel, that is, electrode 117 is disposed to cover both of the transmitting region At and the reflecting region Ar. The electrode 117 is electrically connected to the drain region of the TFT 110X through the reflecting layer 116. In addition, according to the present embodiment, the reflecting layer 116 functions as a reflecting electrode, such that the electrode 117 becoming a transparent electrode does not need to be disposed in a region covering the entire reflecting layer 116 (reflecting region) and a part of the electrode 117 becoming a transparent electrode may be partially stacked with the reflecting layer 116 so as to be electrically connected.

An alignment layer 118 formed of a polyimide resin or the like is disposed on the above-described structure. The alignment layer 118 functions to initially align liquid crystal molecules within the liquid crystal layer 130, and is formed by covering an uncured resin, curing the resin by means of burning or the like, and performing a rubbing process.

On the other hand, the base 120 includes a transparent substrate 121 formed of glass or plastic, and a color filter 122 is disposed on an inner surface of the substrate 121. The color filter 122 has a coloring layer 122at disposed in the transmitting region At and a coloring layer 122ar disposed in the reflecting region Ar. The coloring layers 122at and 122ar include any one color of red, green, and blue as a primary color to be described below. The coloring layer 122at and the coloring layer 122ar within the same sub-pixel basically have the same color, however, may have different hues (color density, chromaticity, color saturation) or different transmittances. In the present embodiment, the coloring layers 122at and 122ar within the same sub-pixel are simultaneously formed of the same coloring material and have the same hue and transmittance.

The color filter 122 has a light shielding layer 122bm formed of a black resin or the like between sub-pixels, between pixels, or between the transmitting region At and the reflecting region Ar. The light shielding layer 122bm functions to shield regions where liquid crystal molecules are not desirably aligned due to an inclined electric field occurring on the edges of electrodes 117 and 123 or step difference of the base 110 or the base 120 so as to prevent a contrast from being degraded due to an optical leakage.

In addition, a passivation layer 122oc formed of an acrylic resin or the like is disposed on the coloring layers 122at and 122ar and the light shielding layer 122bm. The passivation layer 122oc planarises the surface of the color filter 122 while simultaneously preventing impurities from penetrating into the coloring layers 122at and 122ar which may cause deterioration.

The electrode 123 formed of a transparent conductor such as an ITO is disposed on the color filter 122, and an alignment layer 124 as described above is disposed on the electrode 123. In the present embodiment, the TFT 110X is a three-terminal switching element (i.e., a nonlinear element), such that the electrode 117 is an individual pixel electrode per sub-pixel, and the electrode 123 is a common electrode disposed over a plurality of sub-pixels (and a plurality of pixels) (preferably, over the entire device). However, when a two-terminal switching element (nonlinear element) is used instead of the TFT 110X, the opposite to electrode 123 extends in a direction crossing the data line 113, and has a stripe shape where a plurality of stripes are arranged in the extending direction of the data line 113.

The liquid crystal layer 130 is a liquid crystal layer of twisted nematic (TN) mode using a nematic liquid crystal or a super TN (STN) mode, and is formed to work together with polarization plates 141 and 142 disposed at outer sides of the bases 110 and 120 to control transmittance per sub-pixel. In the present embodiment, a thickness of the liquid crystal layer 130 in the transmitting region At is set to be greater than a thickness of the liquid crystal layer 130 in the reflecting region Ar (e.g., about two times), so as to prevent a large difference between depth of modulation of the liquid crystal layer 130 in the transmission display using the transmitting region At and depth of modulation of the liquid crystal layer 130 in the reflection display using the reflecting region Ar.

In the present embodiment, in accordance with presence of the interlayer insulating layers 112 and 115, the difference of thickness between the liquid crystal layer 130 in the transmitting region At and the liquid crystal layer 130 in the reflecting region Ar is secured. However, an insulating layer may be formed on the color filter 122 so as to secure the difference of thickness between the transmitting region At and the reflecting region Ar of the liquid crystal layer 130 in accordance with presence of the insulating layer.

In the present embodiment, the pixel Px shown in FIG. 1 is a basic unit for constituting a minimum unit of a display image, has a rectangular and planar shape, and is composed of four kinds of sub-pixels Dxr, Dxg, Dxc, Dxb. The sub-pixel described herein is a minimum control unit capable of independently controlling a transmittance to each other, and a plurality of the sub-pixels is collected to constitute the pixel Px. Accordingly, the number of the sub-pixels constituting the pixel Px is not generally limited to four. However, the number of the sub-pixels constituting the pixel Px may be an arbitrary number which is more or equal to four in the present embodiment. In addition, the 'coloring region' described herein is a region where each of the coloring layers 122ar and 122at is formed, and corresponds to each of the sub-pixels Dxr, Dxg, Dxc, and Dxb. The four coloring regions are included in one pixel PX.

A cross-sectional structure of the sub-pixel shown in FIG. 2 shows structures of the three sub-pixels Dxr, Dxg, and Dxb among the four sub-pixels, and correspond to coloring layers of R (red), G (green), and B (blue) which are the three primary colors of the filters. It is common that the transmitting region At and the reflecting region Ar are disposed in each structure of the three sub-pixels and the coloring layers 122at and 122ar of R (red), G (green), and B (blue) are disposed in the regions At and Ar in each of the three sub-pixels as described above. In addition, area ratios between the transmitting region At and the reflecting region Ar are almost the same as each other in the three sub-pixels Dxr, Dxg, and Dxb.

The coloring layer 122at is disposed over an entire surface of the transmitting region At in the three sub-pixels Dxr, Dxg, and Dxb. That is, the transmitting region At of each of the three sub-pixels is entirely covered by the coloring layers of primary colors R (red), G (green), and B (blue). On the other hand, the coloring layer 122ar is selectively disposed on a portion of the corresponding region in the reflecting region Ar in the drawing. That is, the reflecting region Ar is not colored by the reflecting layer 116 but has a non-coloring region where lights are reflected. In addition, an occupied area ratio of the coloring layer 122ar within the reflecting region Ar is different from each other per each of the sub-pixels Dxr, Dxg, and Dxb. However, the coloring layer 122ar may be formed to cover at least one of the reflecting regions Ar of the three sub-pixels.

Further, the sub-pixel Dxc, unlike the three sub-pixels Dxr, Dxg, and Dxb, is substantially formed only in the transmitting region At while having an approximate rectangle shape. That is, the reflecting layer 116 is not formed in the sub-pixel Dxc and an entire region of the sub-pixel is formed by the transmitting region. Further, the transmitting region At has almost the same area as the transmitting regions At of the three other sub-pixels. That is, the sub-pixel Dxc according to the present embodiment has a planar shape excluding the reflecting regions Ar of the three other sub-pixels Dxr, Dxg, and Dxb. A coloring layer 122 at having a cyan color which is a complementary filter color is disposed in the transmitting region At of the sub-pixel Dxc.

The transmitting regions At of the four sub-pixels are arranged in a line along a direction (from left to right in the drawing) at one side of the pixel Px in the pixel Px of a planar rectangle shape, thereby constituting a longitudinal transmitting region section. In addition, the reflecting regions Ar of the three sub-pixels Dxr, Dxg, and Dxb are divided and arranged in a line along the direction (from left to right) below the longitudinal transmitting region section in the drawing, that is, at a side opposite to the one side of the pixel Px, thereby constituting a longitudinal reflecting region section in the drawing. Therefore, the transmitting regions corresponding to the coloring layers of R (red), G (green), B (blue), and C (cyan) divided into four regions are disposed at the one side of the pixel Px, the reflecting regions corresponding to the coloring layers of R (red), G (green), and B (blue) divided into three regions are disposed at the side opposite to the one side of the pixel Px, and the sub-pixels Dxr, Dxg, Dxc, and Dxb constituting the pixel Px have different shapes from each other. The longitudinal transmitting region section and the longitudinal reflecting region section are disposed as two sections in parallel with each other up and down within the pixel Px. In addition, the longitudinal transmitting region section and the longitudinal reflecting region section have the same length (i.e., the same length when seen from left to right direction in the drawing) as each other in a direction where each of the regions is arranged.

The length of the arranged regions is divided by four to have four transmitting regions At in the longitudinal transmitting region section. That is, the four transmitting regions At have the same width as each other in the direction of the arranged regions. In addition, the length of the arranged regions is divided by three to have three reflecting regions Ar in the longitudinal reflecting region section. That is, the three reflecting regions have the same width as each other in the direction of the arranged regions.

In the present embodiment, an interconnection-shaped connection electrode 114', which is electrically connected to the semiconductor layer 102 and penetrates below the reflecting layer 116 in the reflecting region Ar of the sub-pixel Dxg or Dxb, is disposed in the TFT 110X for driving the sub-pixel Dxc, and the connection electrode 114' is electrically connected to the electrode 117 of the sub-pixel Dxc within the sub-pixel Dxc.

Figure 5:
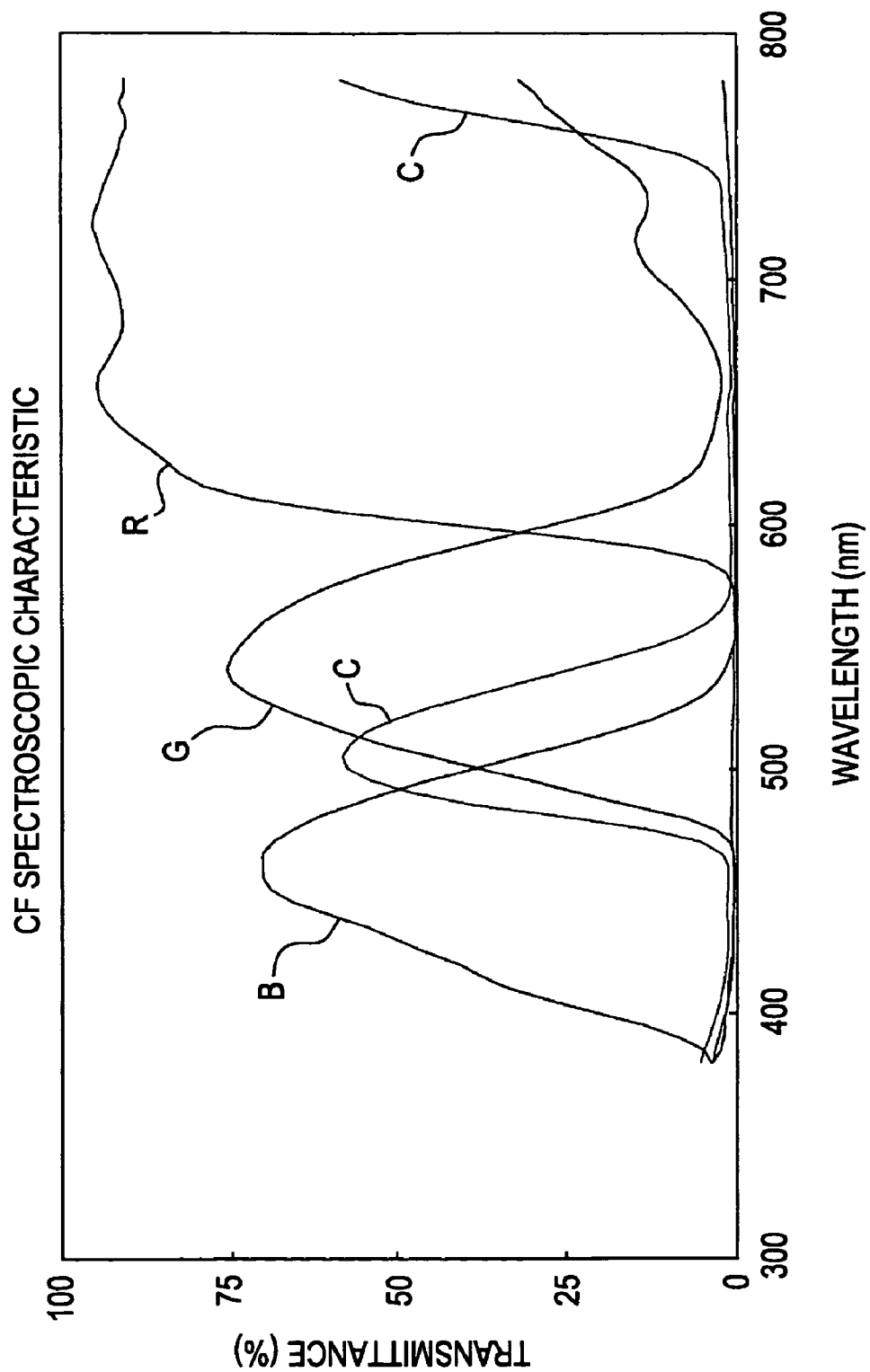
FIG. 5 is a diagram of a spectroscopic spectrum of each of coloring layers in accordance with the embodiments.

FIG. 5 is a diagram of a spectroscopic spectrum of a coloring material of each of the coloring layers 122 at and 122ar of the color filter 122 employed in the present embodiment. Referring to the drawing, transmitting characteristics of the red coloring layer, the green coloring layer, the blue coloring layer, and the cyan coloring layer are denoted as R, G, B, and C, respectively.

Figure 6:
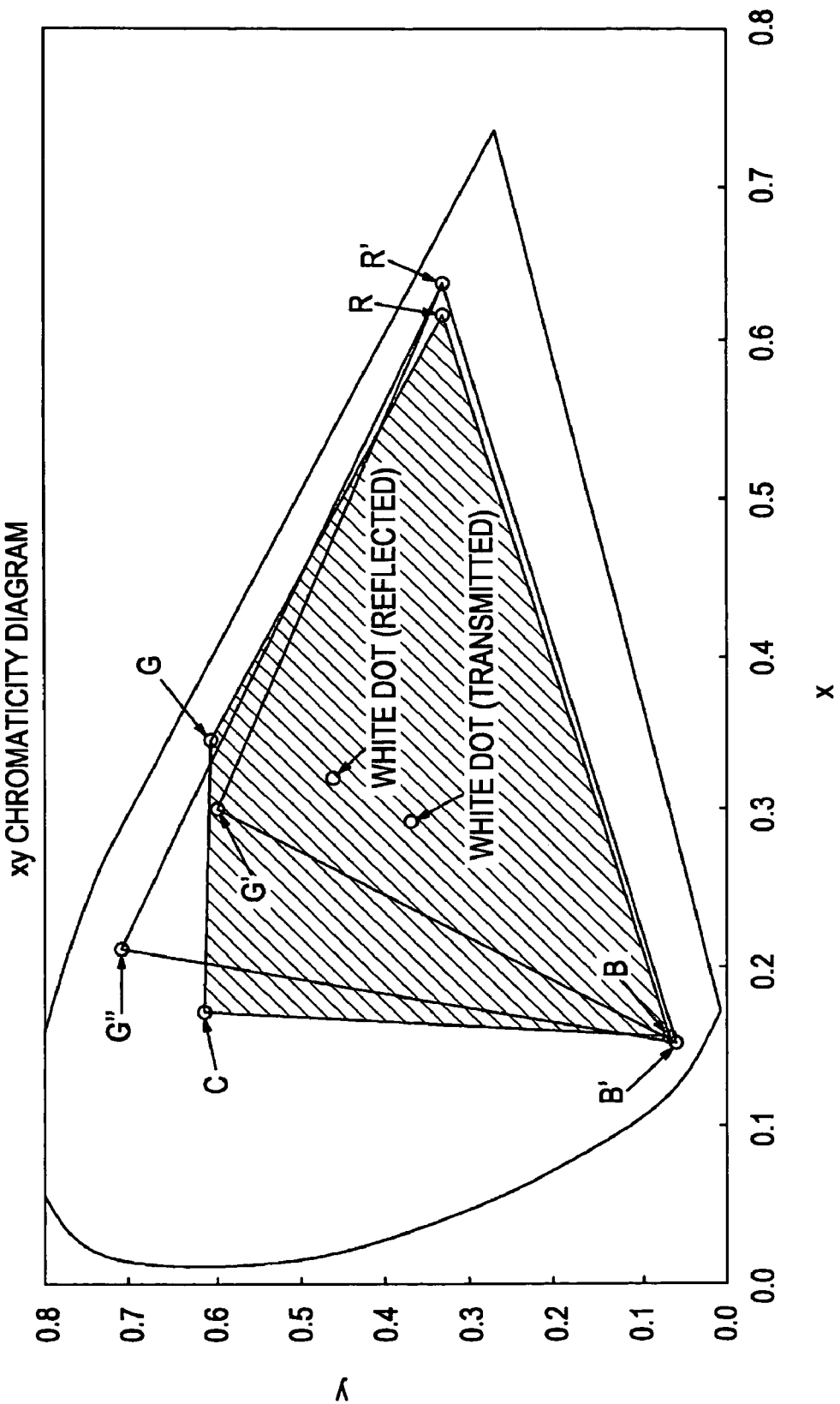
FIG. 6 is a xy chromaticity diagram of hue and color reproducibility range of coloring layers in accordance with the embodiments.

In addition, FIG. 6 is a xy chromaticity diagram of a color reproducibility range utilized by the color filter 122 employed in the present embodiment. Referring to the drawing, R, G, B, and C indicate hues of respective coloring layers shown in FIG. 5. In addition, R', G', and B' indicate desired hues for the red, green, and blue coloring layers to be disposed in the reflecting region Ar, and G" indicates a desired hue for the green coloring layer to be disposed in the transmitting region At. In addition, the curve surrounding the apexes indicates a hue range capable of being perceived by the human eye.

Referring to the chromaticity diagram, since the area of the colored quadrangle surrounded by R, G, B, and C in the present embodiment is larger than the area of the colored triangle having R', G', and B' as apexes, it can be understood that the color reproducibility range of the transmission display of the present embodiment is larger than the color reproducibility range of the reflection display. In addition, when the transmission display is performed on the filter structure having the three primary colors of the related art, a large color reproducibility range can be utilized to some extent as shown by the colored triangle of R', G", and B', however, it can be seen that the color reproducibility range of R, G, B, and C of the present embodiment can be equal to or larger than the color reproducibility range of the related art.

In accordance with the present embodiment, a large color reproducibility range can be utilized on the transmission display using four coloring layers of R, G, B, and C disposed in the transmitting region At, and a bright reflection display can also be utilized using three coloring layers of R, G, and B disposed in the reflecting region Ar. That is, colors can be displayed with four colors which are composed of the three colors and the C (cyan) in the transmission display even when a structure desired for decreasing the color saturations of the three colors of R, G, and B so as to utilize the bright reflection display is employed, such that the color reproducibility of the transmission display can be suppressed from being degraded. Additionally, in this case, the color saturations of the coloring layers 122 at and 122ar disposed in the transmitting region At and the reflecting region Ar do not need to be changed, such that the manufacture process does not need to be complicated and the cost of the manufacture process can be suppressed from increasing by reducing the number of a process for manufacturing the color filter.

The coloring layer 122 at of the sub-pixel Dxc may be formed using a colorant having another color in addition to the cyan color. However, it is preferable to have a hue increasing the color reproducibility range by adding the color to the three primary colors of R, G, and B. For example, it is preferable that the coloring layer has a hue sufficiently separated from the three colors on the chromaticity diagram and also has high color saturation to some extent, that is, a hue selected outside of the colored triangle formed by the three colors on the chromaticity diagram. Complementary colors such as Cyan, Magenta, and Yellow are the most preferable colors for the filter colors.

In addition, only one sub-pixel Dxc besides the three sub-pixels is formed within the pixel Px in the present embodiment. However, a plurality of additional sub-pixels besides the three sub-pixels may be formed. For example, two sub-pixels such as a sub-pixel Dxc having a cyan coloring layer and a sub-pixel Dxm (not shown) having a magenta coloring layer may be formed within the pixel Px and each of these sub-pixels may have the same structure as the sub-pixel Dxc described in the embodiment. Accordingly, one pixel Px is formed by five sub-pixels.

The coloring layer 122 at to be disposed in the transmitting region At and the coloring layer 122ar to be disposed in the reflecting region Ar are simultaneously formed of the same material so as to suppress the manufacture cost from increasing and improve the color reproducibility of the transmission display and sufficiently secure the brightness of the reflection display. Therefore, a coloring layer having a relatively high color saturation is disposed over an entire surface of the transmitting region At while the same coloring layer is partially (selectively) disposed in the reflecting region in the present embodiment. That is, in the reflecting region Ar, the coloring layer is not disposed in the reflecting region and a region where the reflecting layer 116 is exposed is formed. By doing so, the same effect as the case of decreasing the color saturation of the coloring layer 122ar in the entire reflecting region Ar is obtained even when the color saturation of the coloring layer does not significantly decrease. However, the coloring layer 122ar may be formed over an entire surface of the reflecting region Ar in at least one sub-pixel among three sub-pixels.

In addition, all of the transmitting regions have the same area as each other, and all of the reflecting regions also have the same area as each other in the present embodiment, such that the color display control can be easily performed in each of the transmission and reflection displays. Additionally, the only transmitting region At is formed only in the sub-pixel Dxc, such that the increase rate of the area of the pixel Px can be suppressed. Accordingly, the display resolution can be suppressed from being deteriorated.

In addition, the longitudinal transmitting region section of the transmitting regions At in which the coloring layers 122 at of four colors are disposed, and the longitudinal reflecting region section of the reflecting regions Ar in which the coloring layers 122 at of three colors are disposed have the same length as each other in the direction of the arranged regions. Accordingly, the pixel Px can be simply shaped to a planer type such as a rectangle so as to arrange the pixel Px without gaps. In addition, since four color regions are disposed in the longitudinal transmitting region section and three color regions are disposed in the longitudinal reflecting region section within the length range of the same direction of the arranged regions, an average of the arranged direction widths of the reflecting regions Ar becomes larger than an average of the arranged direction widths of the transmitting regions At. Accordingly, the areas of the reflecting regions can be easily increased.

In the present embodiment, three primary colors of red, green, and blue are used as the common filter colors for the transmission and reflection displays while the complementary color such as a cyan color is simultaneously used as the filter color to be set in the transmission display so as to improve the color reproducibility. Therefore, the color reproducibility of green coloring regions can be increased. Furthermore, a large spectral color difference (i.e., a distance on the chromaticity diagram) between a green color and a cyan color may cause to improve the color reproducibility. For example, referring to FIG. 6, the hue apex G of green filter color is set to be separated from the cyan hue apex C more than the filter colors G' and G" according to the related art so as to increase the area of the colored triangle.

Hereinbefore, it has been described that the coloring regions of the sub-pixels Dxr, Dxg, and Dxb correspond to respective R (red), G (green), and B (blue), and the coloring region of the sub-pixel Dxc corresponds to C (cyan). However, the invention is not limited thereto but may be modified as follows.

The coloring regions having four colors may include coloring regions based on a blue hue, coloring regions based on a red hue, and coloring regions of two kinds of hues selected from blue to yellow hues in the visible light region in which hues are changed in accordance to the wavelengths (380 nm to 780 nm). In this case, for example, the blue based hue to be employed is not limited to a pure blue but contains a celadon green or a bluish green. The red based hue may include not only the red color but also the orange color. In addition, the coloring regions may include a single coloring layer or coloring layers having different hues from each other.

In addition, the coloring regions are based on the hues, however, the corresponding hues may be set by properly adjusting the color saturation and brightness. A blue based hue of specific hues ranges from a celadon green color to a bluish green color, and, more preferably, ranges from an indigo color to a blue color. A coloring region of the red based hue ranges from an orange color to a red color. A coloring region of one side selected from hues ranging from a blue color to a yellow color ranges from the blue color to a green color, and, more preferably, ranges from a bluish green color to a green color. A coloring region of the other side selected from hues ranging from a blue color to a yellow color ranges from a green color to an orange color, and, more preferably, ranges from a green color to a yellow color. Alternatively, the coloring region of the other side selected from hues ranging from a blue color to a yellow color ranges from a green color to a yellowish green color.

Here, each of the coloring regions does not use the same hue. For example, when a green based hue is employed in two coloring regions selected from the hues ranging from a blue color to a yellow color, the other side employs a blue based or yellowish green based hue with respect to the green color of the one side. Accordingly, wider color reproducibility can be utilized than the coloring regions of the RGB of the related art.

When this is applied to the embodiment, for example, a coloring region based on a red hue, a coloring region based on a blue hue, a coloring region of hues ranging from green to orange, and a coloring region of hues ranging from blue to green can be disposed in the sub-pixels Dxr, Dxb, Dxg, and Dxc, respectively. Hues of the sub-pixels Dxg and Dxc may be opposite to the above-described case, however, it is preferable to have the hue of the sub-pixel Dxc ranging from blue to green in consideration of the color balance of the display by using the reflecting region Ar or the range of color reproducibility of the display by using the transmitting region At.

In addition, the wide color reproducibility has been described with respect to hues. However, hereinafter, the color reproducibility will be described with respect to wavelengths which transmit coloring regions. The blue based coloring region has a wavelength peak in a range of 415 nm to 500 nm of lights which have transmitted the corresponding coloring region, and preferably, in a range of 435 nm to 485 nm. The red based coloring region has the wavelength peak not less than 600 nm, and preferably, has the wavelength peak not less than 605 nm. The coloring region of one side selected from hues ranging from blue to yellow has the wavelength peak in a range of 485 nm to 535 nm, and preferably, in a range of 495 nm to 520 nm. The coloring region of the other side selected from the hues ranging from blue to yellow has the wavelength peak in a range of 500 nm to 590 nm, and preferably, in a range of 510 nm to 585 nm or in a range of 530 nm to 565 nm.

Next, the coloring regions are indicated in the xy chromaticity diagram. The blue based coloring region corresponds to $x \leq 0.151$ and $y \leq 0.056$, and preferably, $0.134 \leq x \leq 0.151$ and $0.034 \leq y \leq 0.056$. The red based coloring region corresponds to $0.643 \leq x$ and $y \leq 0.333$, and preferably, $0.643 \leq x \leq 0.690$ and $0.299 \leq y \leq 0.333$. The coloring region of one side selected from hues ranging from blue to yellow corresponds to $x \leq 0.164$ and $0.453 \leq y$, and preferably, $0.098 \leq x \leq 0.164$ and $0.453 \leq y \leq 0.759$. The coloring region of the other side selected from hues ranging from blue to yellow corresponds to $0.257 \leq x$ and $0.606 \leq y$, and preferably, $0.257 \leq x \leq 0.357$ and $0.606 \leq y \leq 0.670$.

When the transmitting and reflecting regions are disposed in the sub-pixel, such coloring regions having four colors of the transmitting and reflecting regions can be applied in the above-described ranges.

A light emitting diode (LED) as a light source of RGB, a fluorescent tube, or an organic EL may be used as a backlight. Alternatively, a white color light source may be used. The white color light source may be one that emits lights by means of a blue emitting substance and a YAG fluorescent substance. Examples of the RGB light source are preferably as follows. B has a wavelength peak in a range of 435 nm to 485 nm, G has a wavelength peak in a range of 520 nm to 545 nm, R has a wavelength peak in a range of 610 nm to 650 nm, and the coloring regions can be properly controlled by the wavelengths of the RGB light source to obtain wider color reproducibility. In addition, a light source including, for example, a plurality of wavelength peaks along with a peak in a range of 450 nm to 565 nm may be employed.

Figure 3:
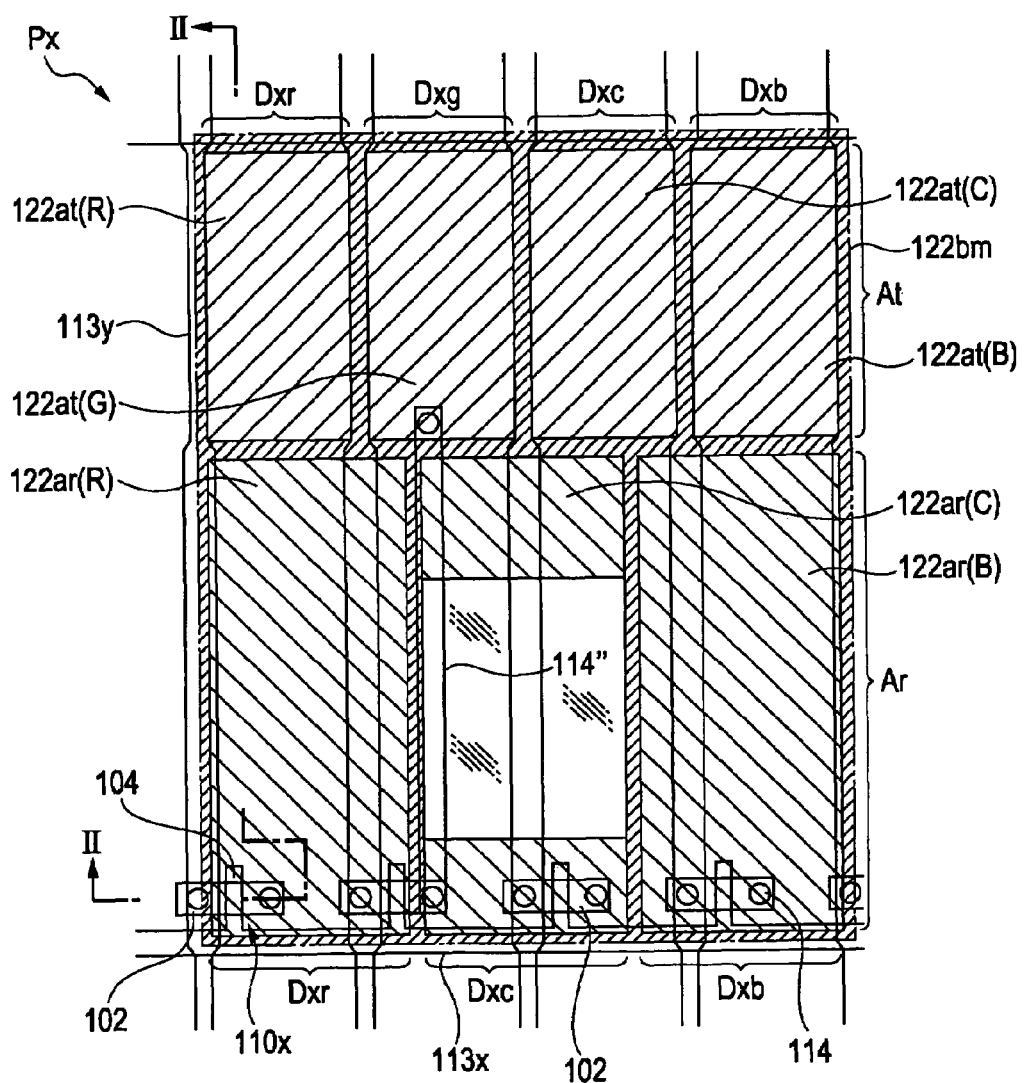
FIG. 3 is a schematic plan diagram of a structure of one pixel of an electro-optical device according to a second embodiment of the invention.

Examples of the structures of the coloring regions having four colors may be as follows:

(1) coloring region having hues of red, blue, green, and cyan (bluish green)
(2) coloring region having hues of red, blue, green, and yellow
(3) coloring region having hues of red, blue, deep green, and yellow
(4) coloring region having hues of red, blue, and emerald, and yellow
(5) coloring region having hues of red, blue, deep green, and yellowish green
(6) coloring region having hues of red, bluish green, deep green, and yellowish green Second Embodiment Next, another embodiment of the invention will be described with reference to FIG. 3. FIG. 3 is a schematic plan diagram of a structure of one pixel of an electro-optical device in accordance with the second embodiment of the invention. In the present embodiment, the same numerals are denoted in the same portions as the first embodiment, such that descriptions thereof will be omitted.

In the present embodiment, the arrangement of the transmitting and reflecting regions within one pixel Px is the same as the first embodiment, however, the sub-pixel Dxg' includes the only transmitting region At and the sub-pixel Dxc' includes the transmitting region At and the reflecting region Ar. Accordingly, in the TFT 110X corresponding to the sub-pixel Dxg', the semiconductor layer 102 has a connection electrode 114'' which penetrates the reflecting region Ar of the sub-pixel Dxr or Dxc' to extend, and the connection electrode 114'' is electrically connected to the electrode 117 of the sub-pixel Dxg'. A cyan coloring layer 122ar is disposed in the reflecting region of the sub-pixel Dxc'.

In the present embodiment, the reflection display is performed with three colors of R (red), C (cyan), and B (blue) colors disposed in the reflecting region Ar, which allows color reflection display having sufficiently high quality be utilized. This is because that the reflection display originally has not only a lower luminance or contrast but also lower color reproducibility compared to the transmission display, and tends to be visible as a green color even in the reflecting region where the coloring layer is not disposed.

In the present embodiment, the coloring layer 122ar is formed over an entire surface of the reflecting region Ar of the sub-pixels Dxr and Dxb and the coloring layer 122ar is partially formed in the reflecting region Ar of the sub-pixel Dxc', however, the coloring layer may be partially formed in all of the three sub-pixels as in the first embodiment, or the coloring layer 122ar may be formed over the entire surface of all of the reflecting regions Ar.

Third Embodiment

Figure 4:
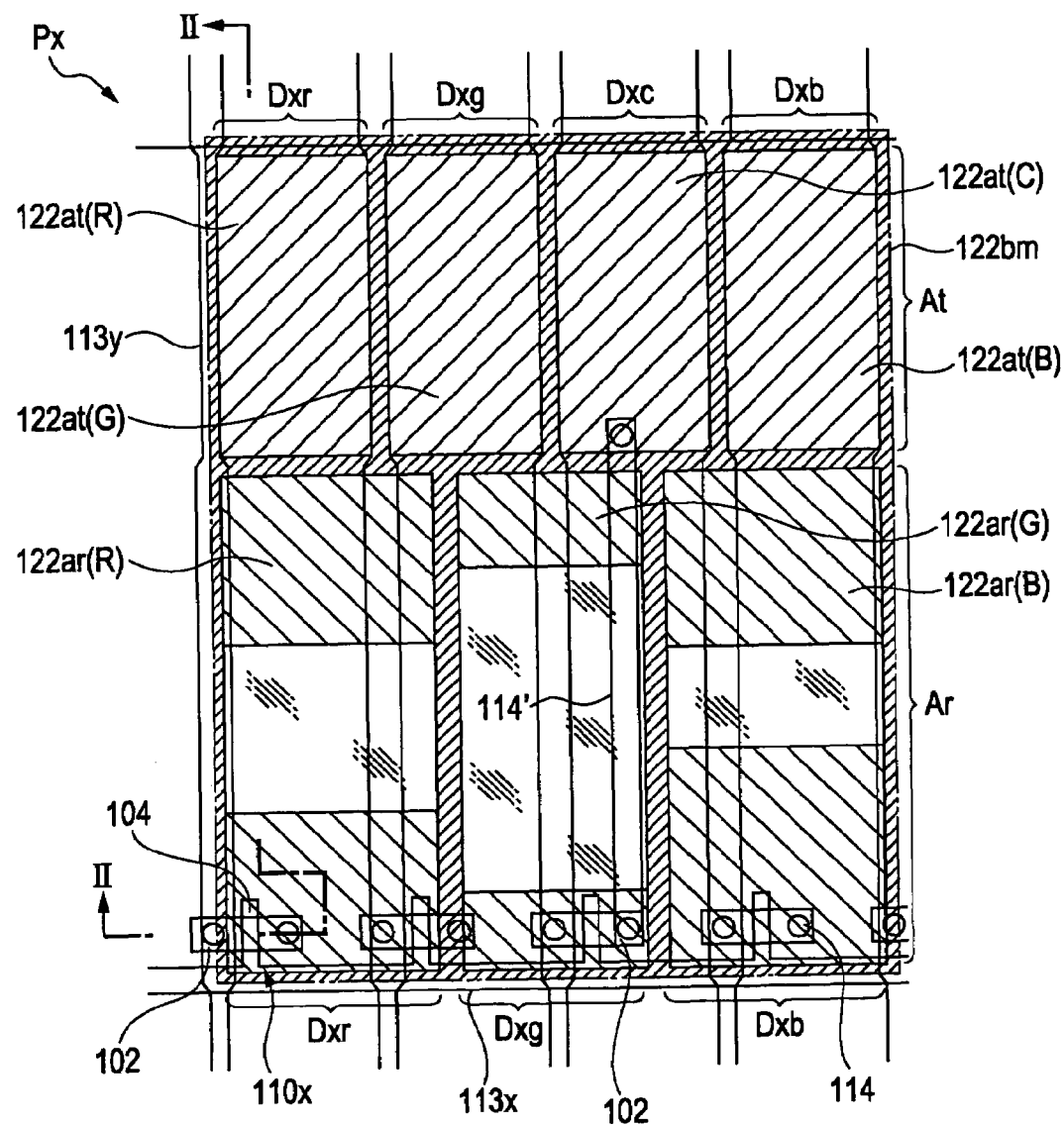
FIG. 4 is a schematic plan diagram of a structure of one pixel of an electro-optical device according to a third embodiment of the invention.

FIG. 4 is a schematic plan diagram of a structure of one pixel of an electro-optical device in accordance with another embodiment of the invention. In the third embodiment, the same numerals are also denoted in the same portions as any of the above-described embodiments, such that descriptions thereof will be omitted.

The present embodiment originally has the same pixel structure as the first embodiments, but differs from the first embodiment in that reflecting regions Ar' formed in sub-pixels Dxr, Dxg, and Dxb have different areas from each other. In this case, within the longitudinal reflecting region section of the reflecting regions Ar' arranged in a direction from left to right of the drawing, without changing the directional length of the arranged regions of the longitudinal reflecting region section (i.e., maintaining the same length as the longitudinal transmitting region section), widths of the arranged region direction of the reflecting regions Ar' are changed from each other to have different region areas from each other.

In the present embodiment, the color display characteristics of the reflection display is different from the transmission display, such that areas between plural reflecting regions Ar' are made to change so as to obtain optimal reflection display. In this case, the area of the reflecting region Ar' where a G (green) coloring layer 122a is disposed is the smallest and the area of the reflecting region Ar' where a B (blue) coloring layer 122ar is disposed. This is because that the reflection display tends to be visible as a green color even in the reflecting region where the coloring layer is not generally disposed.

In addition, the coloring layer 122ar is partially formed in each of the reflecting regions Ar of the three sub-pixels Dxr, Dxg, and Dxb, however, the coloring layer 122ar may be formed over an entire surface of the reflecting region of at least one sub-pixel.

Electronic Apparatus

Figure 7:
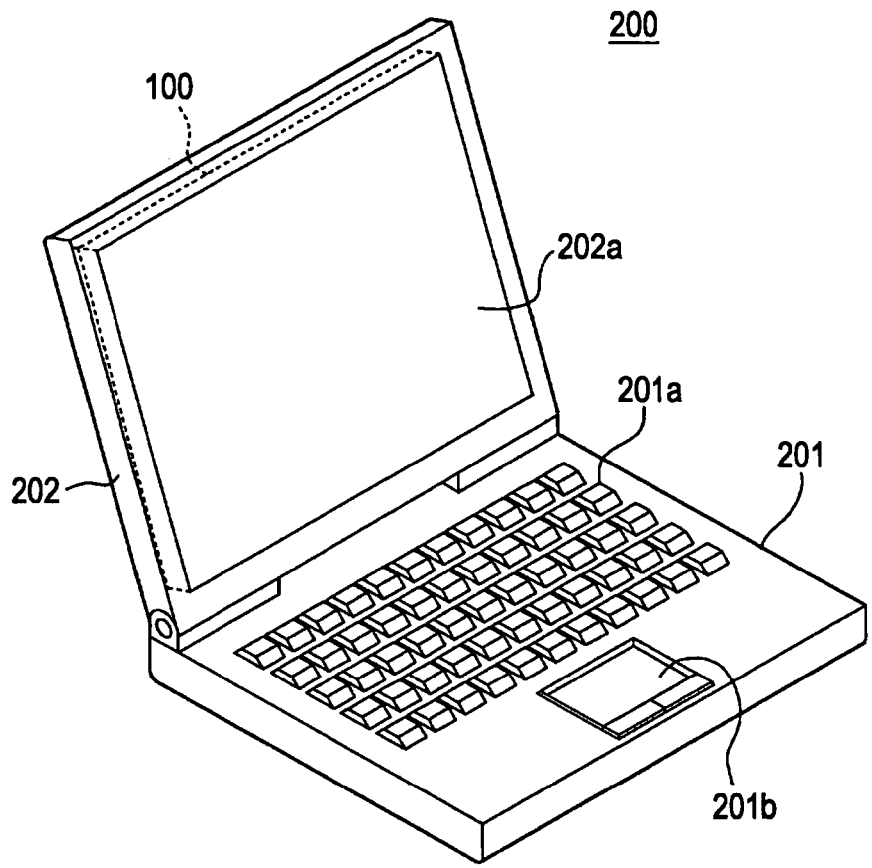
FIG. 7 is a schematic perspective diagram of an example of an electronic apparatus in accordance with the embodiments.

An embodiment where the electro-optical device according to each of the above-described embodiments is applied to an electronic apparatus will be described. FIG. 7 illustrates a personal notebook computer (PC) in accordance with an embodiment of the electronic apparatus. The PC 200 includes a main body 201 having a plurality of operation buttons 201*a* and other control device 201*b*, and a display 202 connected to the main body 201 and having a display screen 202*a*. In this case, the main body 201 and the display 202 are formed to be opened and closed. The above-described electro-optical device (liquid crystal display) 100 is built in the display 202, and a desired display image is disposed on the display screen 202*a*. In this case, a display control circuit for controlling the electro-optical device 100 is disposed within the PC 200. This display control circuit is formed to transmit a predetermined control signal to a known driver circuit (e.g., a liquid crystal driver circuit or the like) that is disposed in the electro-optical device 10 and is not shown, to determine the display mode.

Figure 8:
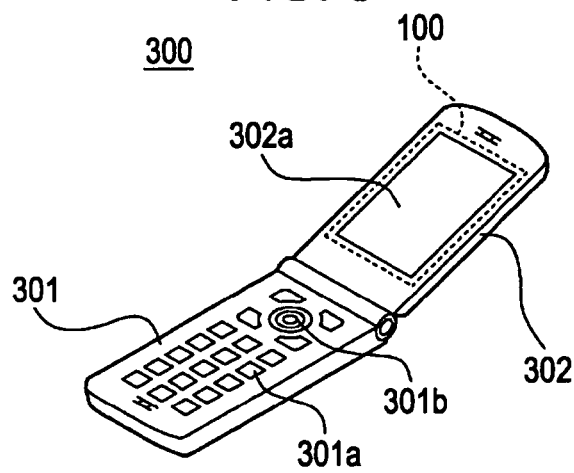
FIG. 8 is a schematic perspective diagram of another example of an electronic apparatus in accordance with the embodiments.

FIG. 8 illustrates a cellular phone in accordance with another embodiment of the electronic apparatus. The cellular phone 300 includes an operational section 301 having a plurality of operation buttons 301*a* and 301*b* and a sender, and a display 302 having a display screen 302 and a receiver, and has the electro-optical device 100 built in the display 302. A display image formed by the electro-optical device can be perceived on the display screen 302*a* of the display 302. In this case, a display control circuit for controlling the electro-optical device 100 is disposed within the cellular phone 300. This display control circuit is formed to transmit a predetermined control signal to a known driver circuit (e.g., a liquid crystal driver circuit or the like) that is disposed in the electro-optical device 100 and is not shown, and to determine the display mode.

Examples of the electronic apparatus may include, in addition to the electronic apparatuses shown in FIGS. 7 and 8, a liquid crystal TV, a car navigation device, a pager, an electronic note, an electronic calculator, a workstation, a picture phone, a Point of Sale (POS) terminal, and so forth. The electro-optical device of the invention may be applied as displays of such various electronic apparatuses.

In addition, it is obvious that the invention is not limited to the above-described embodiments but may have various modifications within the range of the invention. By way of example, a liquid crystal device having a liquid crystal display panel has been described in the present embodiment, however, the invention is not limited to the liquid crystal device but can be applied to other electro-optical devices such as electrophoresis display devices when transmission and reflection displays can be performed using a color filter.

What is claimed is:

1. An electro-optical device for performing color display by transmitting display and/or reflecting display, comprising:
   three sub-pixels corresponding to three colors, each of the sub-pixels having a coloring layer of one color among the three colors;
   a light transmitting region and a light reflecting region in each of the sub-pixels;
   at least one sub-pixel in which a coloring layer having one color that is not one of the three colors is disposed in the transmitting region; and
   one pixel being formed as a display unit by using the transmitting regions of the three sub-pixels corresponding to the three colors and the at least one sub-pixel and the reflecting regions of the three sub-pixels corresponding to the three colors,
   the transmitting regions of the three sub-pixels corresponding to the three colors having a same area as the at least one sub-pixel.

2. The electro-optical device according to claim 1, the reflecting regions of the three sub-pixels corresponding to the three colors having a same area with each other.

3. The electro-optical device according to claim 1, a longitudinal transmitting region section in which the transmitting regions of the three sub-pixels corresponding to the three colors and the at least one sub-pixel are arranged in a line that is disposed in parallel with a longitudinal reflecting region section in which the reflecting regions of the three sub-pixels corresponding to the three colors are arranged in a line, so as to make a directional length of the arranged regions of the longitudinal transmitting region section be equal to a directional length of the arranged regions of the longitudinal reflecting region section.

4. The electro-optical device according to claim 3, the transmitting region being constructed by the longitudinal transmitting region section which is equally divided in the direction of the arranged regions; and the reflecting region being constructed by the longitudinal reflecting region section which is equally divided.

5. The electro-optical device according to claim 1, the three colors being primary colors for a filter, and the color other than the three colors is a complementary color for the filter.

6. The electro-optical device according to claim 5, the color other than the three colors being cyan.

7. An electro-optical device for performing color display by transmitting display and/or reflecting display, comprising:
   three sub-pixels corresponding to three colors, each of the sub-pixels having a coloring region of one color among the three colors;
   a light transmitting region and a light reflecting region in each of the sub-pixels;
   at least one sub-pixel in which a coloring region having one color other than the three colors is disposed in the transmitting region; and
   one pixel being formed as a display unit by using the transmitting regions of the three sub-pixels corresponding to the three colors and the at least one sub-pixel and the reflecting regions of the three sub-pixels corresponding to the three colors,
   the transmitting regions of the three sub-pixels corresponding to the three colors and the at least one sub-pixel having a same area with each other.

8. The electro-optical device according to claim 7, the reflecting regions of the three sub-pixels corresponding to the three colors having a same area with each other.

9. The electro-optical device according to claim 7, a longitudinal transmitting region section in which the transmitting regions of the three sub-pixels corresponding to the three colors and the at least one sub-pixel are arranged in a line being disposed in parallel with a longitudinal reflecting region section in which the reflecting regions of the three sub-pixels corresponding to the three colors are arranged in a line, so as to make a directional length of the arranged regions of the longitudinal transmitting region section be equal to a directional length of the arranged regions of the longitudinal reflecting region section.

10. The electro-optical device according to claim 9, the transmitting region being constructed by the longitudinal transmitting region section which is equally divided in the direction of the arranged regions; and the reflecting region being constructed by the longitudinal reflecting region section which is equally divided.

11. The electro-optical device according to claim 7, the coloring region corresponding to the three colors being one of a coloring region based on a blue hue, a coloring region based on a red hue, and one of two coloring regions of two kinds of hues selected from hues ranging from the blue hue to a yellow hue among visible light regions in which hues change in accordance with wavelengths; and the coloring region corresponding to the color other than the three colors is the other of the two coloring regions of two kinds of hues selected from the hues ranging from the blue hue to the yellow hue.

12. The electro-optical device according to claim 11, the coloring regions of the two kinds of hues selected from the hues ranging from the blue hue to the yellow hue being a coloring region of a green hue from the blue hue and a coloring region of an orange hue from the green hue.

13. The electro-optical device according to claim 7, the coloring regions corresponding to the three colors being one of a first coloring region having a wavelength peak of light in a range of 415 nm to 500 nm which has transmitted the corresponding coloring region, a second coloring region having a second wavelength peak which is more or equal to 600 nm, a third coloring region having a third wavelength peak in a range of 485 nm to 535 nm, and a fourth coloring region having a fourth wavelength peak in a range of 500 nm to 590 nm; and the coloring region corresponding to the color other than the three colors is the third coloring region or the fourth coloring region.

14. The electro-optical device according to claim 13, the third coloring region having the third wavelength peak of light in a range of 495 nm to 520 nm which has transmitted the corresponding coloring region; and the fourth coloring region having the fourth wavelength peak of light in a range of 510 nm to 585 nm which has transmitted the corresponding coloring region.

15. An electronic apparatus, comprising:
 the electro-optical device according to claim 1; and
 a control unit which controls the electro-optical device.

* * * * *